United States Patent [19]
Yamamura et al.

[11] Patent Number: 5,536,159
[45] Date of Patent: Jul. 16, 1996

[54] INJECTION MOLDING MACHINE

[75] Inventors: Masato Yamamura, Hachioji; Katsushi Hirose, Fujiyoshida; Naotake Takeyama, Oshino-mura, all of Japan

[73] Assignee: Fanuc Ltd., Yamanashi, Japan

[21] Appl. No.: 338,204

[22] Filed: Nov. 9, 1994

[30] Foreign Application Priority Data

Nov. 11, 1993 [JP] Japan ................................ 5-304578

[51] Int. Cl.⁶ ............................................... B29C 45/77
[52] U.S. Cl. ............................................ 425/149; 425/150
[58] Field of Search ...................................... 425/149, 150

[56] References Cited

U.S. PATENT DOCUMENTS

| | | | |
|---|---|---|---|
| 4,855,095 | 8/1989 | Sato | 425/150 |
| 5,352,394 | 10/1994 | Fujita et al. | 425/150 |

Primary Examiner—Tim Heitbrink
Attorney, Agent, or Firm—Staas & Halsey

[57] ABSTRACT

An injection molding machine in which injection units are arranged at any selected surface of a mold to perform an injection molding operation. The machine comprises a main injection unit, which has a main NC unit for controlling servomotors for thrusting and rotating a screw and moving an injection cylinder for each injection unit and for controlling servomotors for clamping the mold and ejecting the molded product, and a sub-injection unit, which has a sub NC unit for controlling only the servomotors for thrusting and rotating the injection screw and moving the injection cylinder for the respective injection unit. The main injection unit and the sub-injection unit is movable toward and away from a mold clamping unit. The main NC unit of the main injection unit controls the timing of operation of the sub-injection unit and controls the servomotors of the main injection unit and the mold clamping unit via a connector.

10 Claims, 13 Drawing Sheets

F I G. 8

| MOLD CODE | INJECTION UNIT CODE / MOLDING CONDITIONS FOR INJECTION UNIT | | | MOLDING CONDITIONS FOR MOLD CLAMPING UNIT |
|---|---|---|---|---|
| | S (1) | S (2) | S (3) | |
| C (1) | D (1, 1) / d (1, 1) | D (1, 2) / d (1, 2) | D (1, 3) / d (1, 3) | d (1) |
| C (2) | D (2, 1) / d (2, 1) | D (2, 2) / d (2, 2) | D (2, 3) / d (2, 3) | d (2) |
| C (3) | D (3, 1) / d (3, 1) | D (3, 2) / d (3, 2) | D (3, 3) / d (3, 3) | d (3) |
| ⋮ | ⋮ | ⋮ | ⋮ | ⋮ |

INJECTION MOLDING MACHINE

BACKGROUND OF THE INVENTION

1. Field of the Invention

This invention relates to an injection molding machine, and more particularly to an injection molding machine having a plurality of injection units.

2. Description of the Related Art

There is currently known an injection molding machine of the type in which a plurality of injection units arranged at the respective side surfaces of a mold clamping unit with a mold mounted thereon to perform an injection molding. With this conventional type injection molding machine, it is impossible to exchange the injection molding units, which are arranged in facing relation to the respective side surface of the mold clamping unit.

SUMMARY OF THE INVENTION

It is an object of this invention to provide an injection molding machine in which injection units are arranged at any selected surface of a mold mounted on a mold clamping unit to perform an injection molding.

Another object of the invention is to provide an injection molding machine which enables to avoid an inconsistency in the molding condition and the specification of the injection unit due to the error in selection and disposition of the injection units, which causes a molding abnormality such as lack of shot capacity or lack of injection holding pressure.

Still another object of the invention is to provide an injection molding machine in which exchange and attachment of injection units can be performed reliably and quickly.

According to a first aspect of the invention, there is provided an injection molding machine comprising: a mold clamping unit on which a mold is mounted, said mold clamping unit having mold code input unit for inputting a mold code representing the kind of the mounted mold and electric motors for clamping the mold and ejecting a molded product; a main injection unit arranged in facing relation to a side surface of said mold clamping unit, said main injection unit having an injection cylinder, an injection screw, electric motors for thrusting and rotating said injection screw and moving said injection cylinder, and main control unit for controlling said electric motors in said mold clamping unit and said main injection unit; at least one sub-injection unit arranged in facing relation to a side surface of said mold clamping unit, said sub-injection unit having an injection cylinder, an injection screw, electric motors for thrusting and rotating said injection screw and moving said injection cylinder, and sub-control unit for controlling said electric motors provided in said sub-injection unit; and a connector for electrically connecting said main control unit with said sub-control unit and for electrically connecting said main control unit with said mold clamping unit. The main control unit and the sub-control unit have storage unit for storing an operating program and a molding condition for each of said main injection unit and sub-injection unit and for each of a plurality of mold codes. The main control unit controls the operation of said main injection unit and said mold clamping unit according to the operating program and the molding condition associated with the input mold code, and said sub-control unit controls the operation of said sub-injection unit according to the operating program and the molding condition associated with the respective mold code.

With the above arrangement, it is possible to arrange the injection units at any selected side surface of the mold mounted on the mold clamping unit.

Further, the storage unit of the main control unit further stores injection unit codes of the injection units to be arranged in facing relation to the respective side surfaces of the mold clamping unit for each of the mold codes. Each injection unit has an identification code storage unit for storing an identification code representing the specification of the respective injection unit. The main control unit has an identification code reading unit for reading the identification codes of the injection units actually arranged at the respective side surfaces of the mold clamping unit, a comparing unit for comparing the injection unit code associated with the input mold code with the identification code for the respective side surface of the mold clamping unit, and an attachment state checking unit for outputting an abnormality detection signal when an disagreement is detected by the comparing unit. With this arrangement, it becomes possible to avoid a molding abnormality due to an error in selecting and/or positioning the injection unit.

The identification code reading unit has surface information storage means provided on each side surface of said mold clamping unit, for storing surface information specifying the respective side surface of said mold clamping unit, and surface information reading means provided in each injection unit, and reads the surface information read by said surface information reading unit and also the identification code of each injection unit.

According to a second aspect of the invention, each of the injection units has a control unit equivalent to the main control unit, and only the control unit of one injection unit is electrically connected with the mold clamping unit. The control unit connected with the mold clamping unit controls the electric motors for the injection units and the electric motors for the mold clamping unit. Each remaining control unit controls only the electric motors for the respective injection units.

According to a third aspect of the invention, the injection molding machine includes a separate control unit for controlling the electric motors for the mold clamping unit and for controlling the electric motors for all the injection units. The control unit is electrically connected with the individual injection units and the mold clamping unit so that the same operation as described above can be realized.

The above control unit may be separate from the injection units and the mold clamping unit, or may be provided in the clamping unit and fixedly connected with the electric motors for clamping the mold and ejecting the molded product in the mold clamping unit. With the latter structure in which the control units are provided in the mold clamping unit, it is unnecessary to connect the control units with the mold clamping unit, and it is only necessary to connect the control unit with the individual injection units.

BRIEF DESCRIPTION OF THE DRAWINGS

FIG. 8 is a table showing an example of molding condition storing file in the respective embodiments;

DETAILED DESCRIPTION

Figure 1:
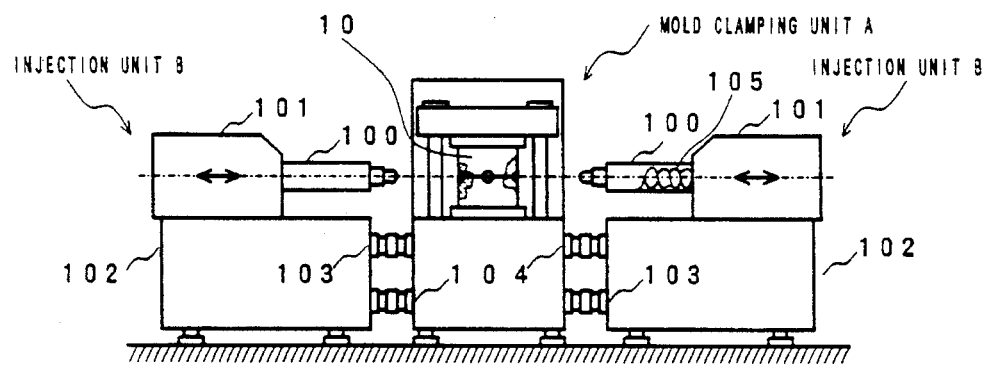
FIG. 1 is a schematic view of an injection molding machine according to the present invention.

FIG. 1 shows the general construction of a horizontal type injection molding machine according to this invention. The injection molding machine generally comprises a mold clamping unit A, and a plurality of separate type injection units B arranged around the molding clamping unit A.

The mold clamping unit A includes a mold clamping servomotor for driving a movable platen to open, close and clamp a mold 10 in a horizontal direction, and an ejecting servomotor for ejecting a molded product. By controlling these servomotors, the opening and closing of the mold, the clamping of the mold and the ejecting of the molded product are performed.

Each injection mold B includes an injection cylinder 100 in which an injection screw 105 for pressure holding and measuring/mixing is inserted, a movable unit 101 in which a screw rotating servomotor for measuring/mixing and a screw thrusting servomotor (injection servomotor) for driving the screw in the axial direction to apply injection dwell pressure and backing pressure are installed, and a unit base 102 on which the movable unit 101 is mounted.

The movable unit 101 is movably mounted on a unit base 102 and is moved with the injection cylinder 100 axially of the cylinder 100 by a cylinder moving servomotor mounted in the unit base 102, to perform a nozzle touch and sprue break.

At an end surface of the unit base 102, closer to the forward end of the injection cylinder 100, there is provided a connecting member 103 to be connected with a coupling device 104 mounted on each side surface of the mold clamping unit A. Since the connecting member 103 is detachably connected with the coupling device 104, different kinds of injection units B, each having a specification such as the maximum shot capacity and the output of the screw thrusting servomotor, can be selectively disposed at the respective surface of the mold clamping unit A.

Figure 3:
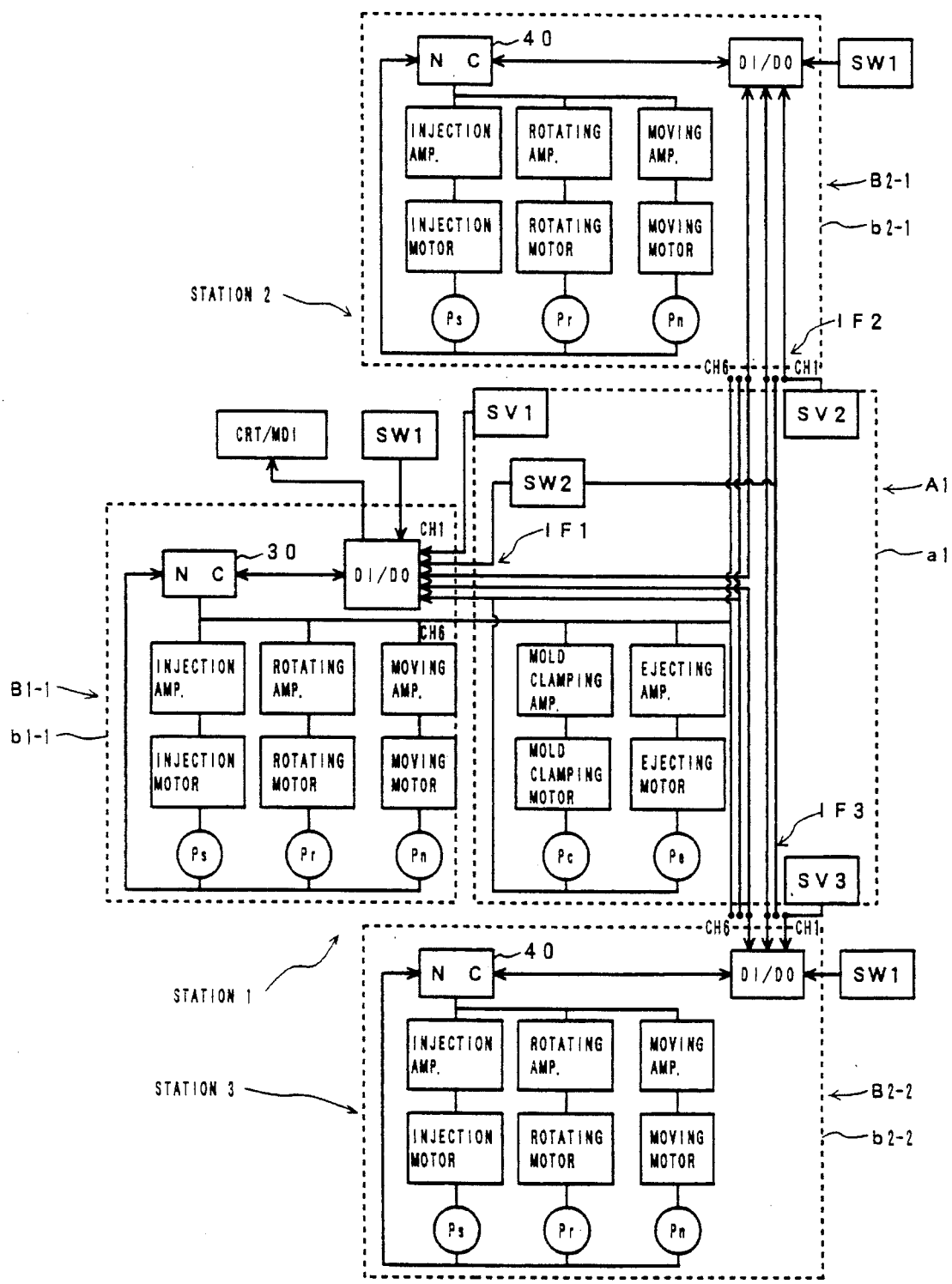
FIG. 3 is a block diagram showing a main part of the control section according to a first embodiment.

FIG. 3 is a block diagram showing a control device according to the first embodiment, which is adopted for controlling the operation of the injection molding machine as shown in FIG. 1. A section a1 surrounded by dotted lines is a clamping control section provided in the mold clamping unit A1, and sections b1-1, b2-1 and b2-2 surrounded by dotted lines are injection unit control sections provided in the injection units B1-1, B2-1, B2-2, respectively. The control section b1-1 of the injection unit B1-1 is slightly different in construction from the control sections b2-1, b2-2 of the injection units B2-1, B2-2.

The control section a1 of the mold clamping unit A1 comprises a mold clamping servo amplifier and an ejecting servo amplifier for driving the clamping servomotor and the product ejecting servomotor, respectively, and further comprises pulse coders Pc, Pe for detecting the position and speed of the servomotors.

IF1, IF2 and FI3 in FIG. 3 conceptually represent electrical connecting devices arranged one set for each surface of the mold clamping unit A1. The mold clamping unit A1 further has surface information storage devices SV1, SV2 and SV3 for storing attaching surface codes specifying the respective surfaces of the mold clamping unit A1. Each surface information storage devices SV1, SV2 and SV3 is composed of a DIP switch and an IC card, etc., which have a bit number of necessary information content. The surface information storage devices SV1, SV2 and SV3 are connected to the respective first channels of the connecting devices IF1, IF2 and IF3 so that the attaching surface codes are read from outside. The term "channel" means a set of signal lines necessary for transmitting various kinds of information, control signals, feedback signals, etc. but does not mean a single signal line.

The attaching surface code S(1), stored in the surface information storage device SV1, specifies a first surface, i.e. a station 1, of the mold clamping unit A1. Likewise, the attaching surface codes S(2) and S(3) stored in the surface information storage devices SV2 and SV3 specify first and third surfaces, i.e. stations 2 and 3, of the mold clamping unit A1, respectively.

The mold clamping servo amplifier and the ejecting servo amplifier are connected to the respective sixth channels of the connecting devices IF1, IF2 and IF3, and the feedback outputs from the pulse coders Pc and Pe of each servomotor are connected to the respective fifth channels of the connecting devices IF1, IF2 and IF3. Accordingly, from any one of the connecting devices IF1, IF2 and IF3, it is possible to drivingly control the mold clamping servomotor and the ejecting servomotor. Further, in a control panel of the mold clamping unit A1 there is provided a mold code set switch SW2 for inputting and setting a mold code indicating the kind of a mold mounted on the mold clamping unit A1. The mold code set by the switch SW2 is read via the second channel of the respective connecting device IF1, IF2 and IF3.

The injection unit B1-1 has a NC unit 30, as a main control unit, for drivingly control the servomotors for thrusting the screw (for injection), for rotating the screw and for moving the cylinder in the injection unit B1-1. The feedback outputs from the pulse coders Ps, Pr and Pn as position and speed detectors of the respective servomotors in the injection unit B1-1 are fed back to the NC unit 30.

In the arrangement as shown in FIG. 3, the drive control signal lines from the NC unit 30 of the injection unit B1-1 are connected to the mold clamping servo amplifier and the ejecting servo amplifier of the mold clamping unit A1 via the sixth channel of the connecting device IF1 so that the mold clamping servomotor and the ejecting servomotor of the mold clamping unit A1 are drivingly controlled by the NC unit 30 of the injection unit B1-1. The feedback outputs from the respective pulse coders Pc and Pe of the mold clamping unit A1 are fed back to the NC unit 30 of the injection unit B1-1 via the fifth channel of the connecting device IF1 and a input/output circuit of the injection unit B1-1.

CRT/MDI is a manual data input device with a display for displaying the setting and inputting various data and various kinds of information such as an error message, and is connected to the numeral control unit 30 of the injection unit B1-1 via the input/output circuit. SW1 is a setup switch such as a DIP switch for setting an injection unit identification code indicating the inherent specification of an injection unit. The third and fourth channels of the connecting means IF1 are channels for inputting and outputting data between the injection unit B1-1 disposed at the station 1 and the injection units B2-2, B2-3 respectively disposed at the stations 2, 3.

Alternatively, the amplifiers for the mold clamping servomotor and the ejecting servomotor may be arranged at the injection unit B1-1 rather than the mold clamping unit A1.

In FIG. 3, the injection unit B1-1 having the NC unit 30 as the main control means is connected to the station 1. Alternatively, the injection unit B1-1 may be connected to the station 2 or the station 3. If the injection unit B1-1 is connected to the station 2 or the station 3, the mold clamping servomotor and the ejecting servomotor of the mold clamping unit A1 is drivingly controlled by the NC unit 30 of the injection unit B1-1 via the sixth channel (driving control signal) and the fifth channel (feedback signal) of the connecting device IF2 or IF3. If the injection unit B1-1 is connected to the station 2, the injection unit B1-1 is connected to the injection units B2-2 and B2-1, which are respectively connected to the stations 3 and 1, via the third and fourth channels of the connecting device IF2. If the injection unit B1-1 is connected to the station 3, it is connected to the injection units B2-1 and B2-2, which are respectively connected to the stations 2 and 1, via the third and fourth channels of the connecting device IF3.

Each injection unit B2-1 and B2-2 has a NC unit 40 for drivingly controlling servomotors for thrusting the screw, rotating the screw and moving the cylinder in the injection unit. Each NC unit 40 drivingly controls the screw thrusting servomotor, the screw rotating servomotor and the cylinder moving servomotor in each injection unit, based on the information transmitted from the NC unit 30 of the injection unit B1-1. The feedback outputs from the respective pulse coders Ps, Pr and Pn are fed back to the NC unit 40. Each injection unit B2-1 and B-2-2 has an identification code set switch SW1 for setting an injection unit identification code indicating the inherent specification of the injection unit, and an input/output circuit.

Figure 2:
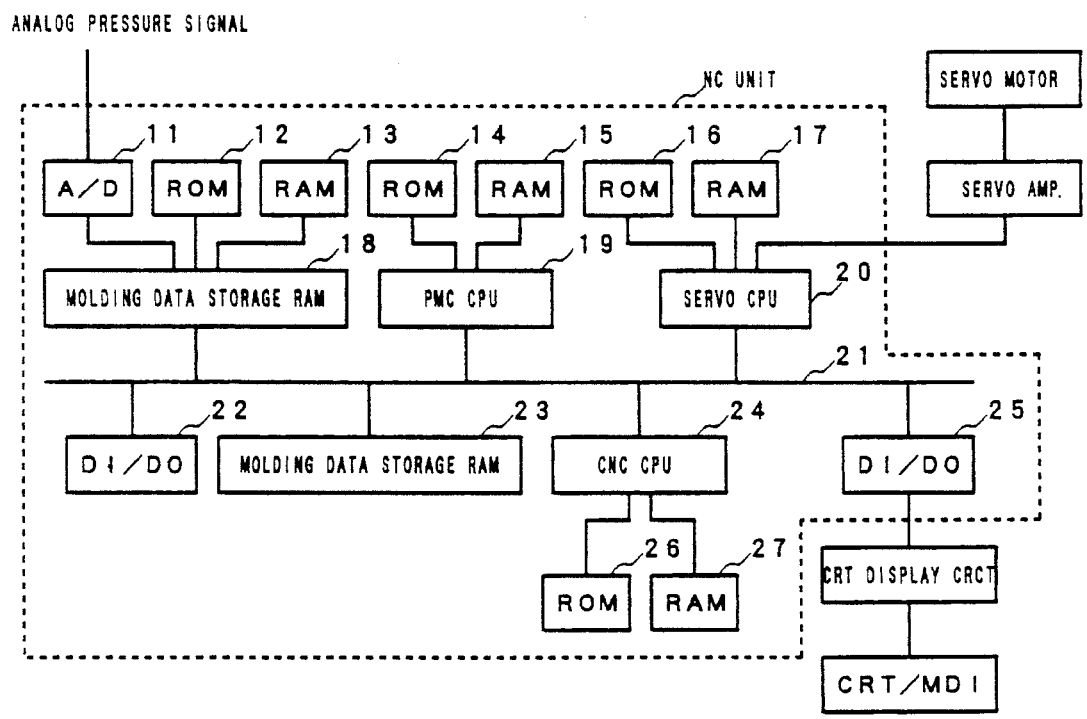
FIG. 2 is a block diagram showing a NC (numerical control) unit mounted in a control section of the injection molding machine.

FIG. 2 is a block diagram schematically showing the constructions of the NC units 30, 40. Each NC unit has a CNC CPU 24 which is a microprocessor for numerical control, a PMC CPU 19 which is a microprocessor for programmable machine control, a servo CPU 20 which is a microprocessor for servo control, and a pressure monitoring CPU 18 for detecting resin pressure acting on the respective screw, via an analog/digital converter 11. Information is transmitted between the individual microprocessors via a bus 21.

The pressure monitoring CPU 18 samples the injection dwell pressure and the screw backing pressure in each injection unit based on a signal outputted from the pressure detector provided in each injection unit.

A ROM 114 for storing sequence programs for controlling the sequence operation (including the sequence operation of the mold clamping unit A1 in the case of the NC unit 30) of the injection unit, and a RAM 15 for a temporary storage of arithmetic data are connected to the PMC CPU 18. A ROM 26 for storing programs for controlling each operation step (including the operation steps for closing, clamping and opening of the mold in the case of the NC unit 30) of the injection, and a RAM 27 for a temporary storage of arithmetic data are connected to the CNC CPU 24.

A ROM 16 for storing a serve control dedicated control program, and a RAM 17 for a temporary storage of data are connected to the servo CPU 20. A ROM 12 for storing a control program concerning the sampling of molding data, and a RAM 13 for a temporary storage of data are connected to the pressure monitoring CPU 18. Further, to the servo CPU 20, the above-mentioned servo amplifiers for driving the servomotors for the respective axes, such as servomotors for thrusting the screw, rotating screw and moving the cylinder (including the mold clamping servomotor and the ejecting servomotor in the mold clamping unit A1 in the case of NC unit 30) in each injection unit are connected. Each of the feedback pulses from the pulse coders Ps, Pr and Pn (including Pc and Pe in the case of NC unit 30) of each motor is fed back to the servo CPU 20 by which the current position and speed of each axis are obtained. The current position and speed of each axis will then one after another updated and stored in a current position storing register and a current speed storing register.

The input/output interface 22 receives signals from limit switches arranged at various portions of each injection unit and the control panel, and transmits various kinds of commands to the NC units in the other injection unit and peripheral equipment. The manual data input device with display (CRT/MDI) is connected to the input/output circuit of the NC unit 30, as occasion arises, via a CRT display circuit for display control, thus performing selection of display screen, inputting of various data, etc.

A nonvolatile memory 23 is a molding data reserving RAM which is provided in every NC unit of the injection unit control sections b1-1, b2-1 and b2-2. The nonvolatile memory 23 stores various kinds of molding conditions concerning the injection molding operation, such as injection pressure holding condition, measuring/mixing condition, various kinds of set values concerning the opening, closing and clamping of the mold, parameters, macro variables, etc.

With the foregoing arrangement, inputting and outputting of signals for timing the driving and controlling, such as starting of injection, via the third and fourth channels of each connecting device IF1, IF2 and IF3 between the NC unit 30 and each NC unit 40. The CNC CPU 24 of each NC unit performs pulse distribution to the servomotors of each axis of each injection unit (including each axis of the mold clamping unit A1 in the case of the NC unit 30) based on the control program stored in the respective ROM 26. The servo CPU 20 of each NC unit performs, likewise the conventional art, digital servo control such as position loop control, speed loop control and electric current loop control, based on the pulse distributed moving commands for the respective axes and the feedback signals of the position and speed detected by the pulse coders of each axis.

FIG. 8 is a table schematically showing an example of molding condition storage file in the nonvolatile memory 23.

In the nonvolatile memory 23 of each NC unit 30 and 40, an injection unit code D (i, j) indicating the specification of an injection unit to be mounted at each station of the mold clamping unit A1, indicated by the attaching surface code S(j), and the molding condition d(i,j) for each injection unit are stored for a mold code C(i) indicating the kind of a mold to be mounted on the mold clamping unit A1. Further, for each mold code C(i), set values d(i) of the molding conditions for the mold clamping unit A1, i.e. the mold moving speed, the terminal position of mold opening, the clamping force and the timing of product ejection are stored. The molding conditions d(i,j) for the injection unit arranged in each station includes molding conditions for injection and pressure holding, such as the injection step number, the pressure holding step number, the set values for switching position or switching time for each of the steps, the set injection speed of each injection step and the set dwell pressure of each pressure holding step, and set conditions concerning measurements of resin including the screw rotating speed, the backing pressure, the switching position, the screw retracted position, etc. The molding condition d(i) is stored only in the nonvolatile memory 23 of the NC unit 30 in the injection unit control section b1-1.

For example, with regard to the mold having the mold code C(1), at the station 1 indicated by the attaching surface code S(1), an injection unit having the injection unit code D(1,1) is required to be mounted, and injection, pressure holding and measuring/mixing steps are performed at the molding conditions indicated by d(1,1) for that injection unit. Likewise, at the stations 2 and 3 indicated by the attaching surface codes S(2) and S(3), the injection units having the respective injection unit codes D(1,2) and D(1,3) are required to be mounted, and injection, pressure holding and measuring/mixing steps are performed at the molding conditions indicated by d(1,2), d(1,3) for the respective injection units. Further, for the mold clamping unit A1, mold opening, mold closing, mold clamping and product ejecting steps are performed at the molding conditions indicated by d(1).

Figure 4:
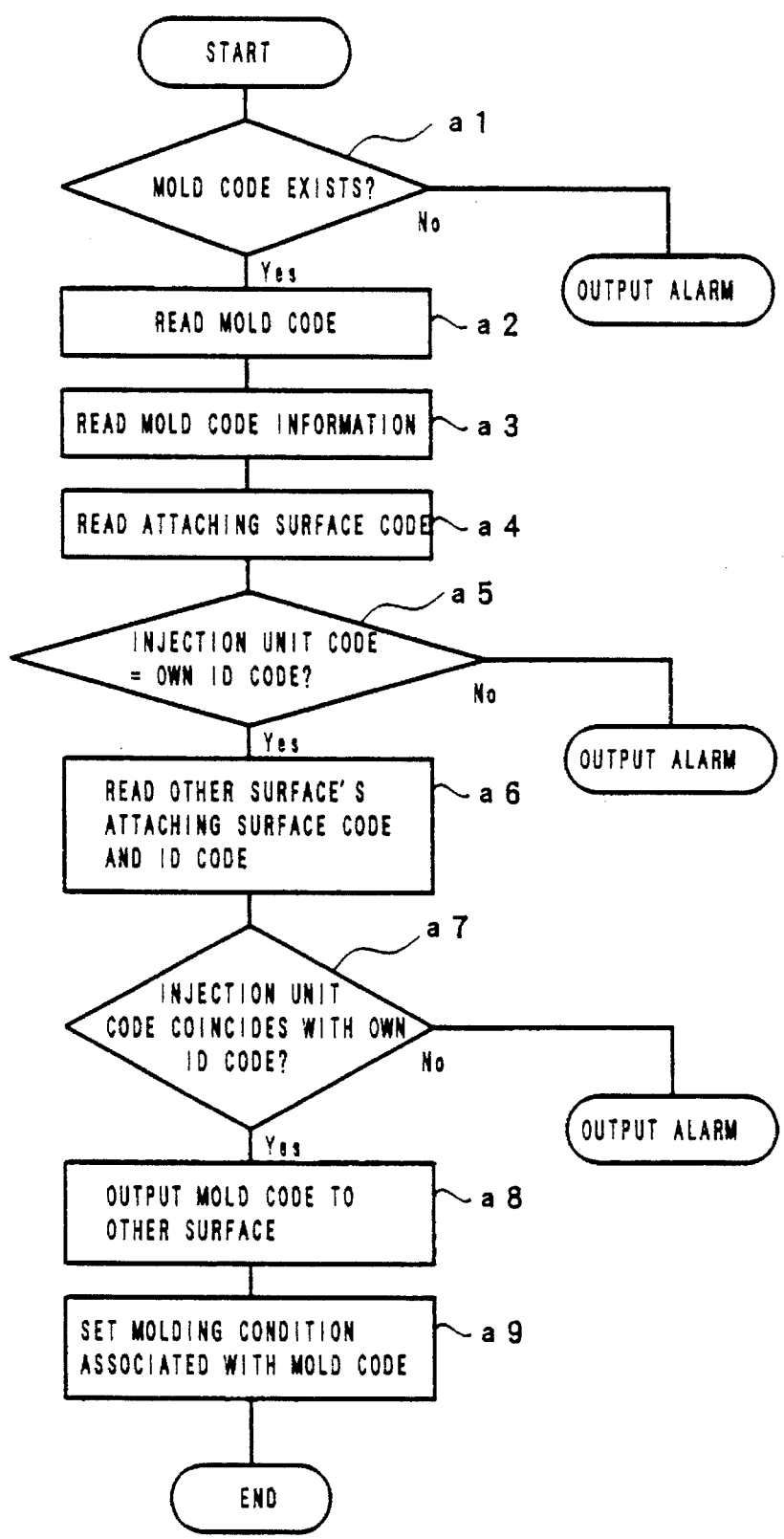
FIG. 4 is a flowchart schematically showing an attachment state checking procedure to be executed by a main control section in the first embodiment.
Figure 5:
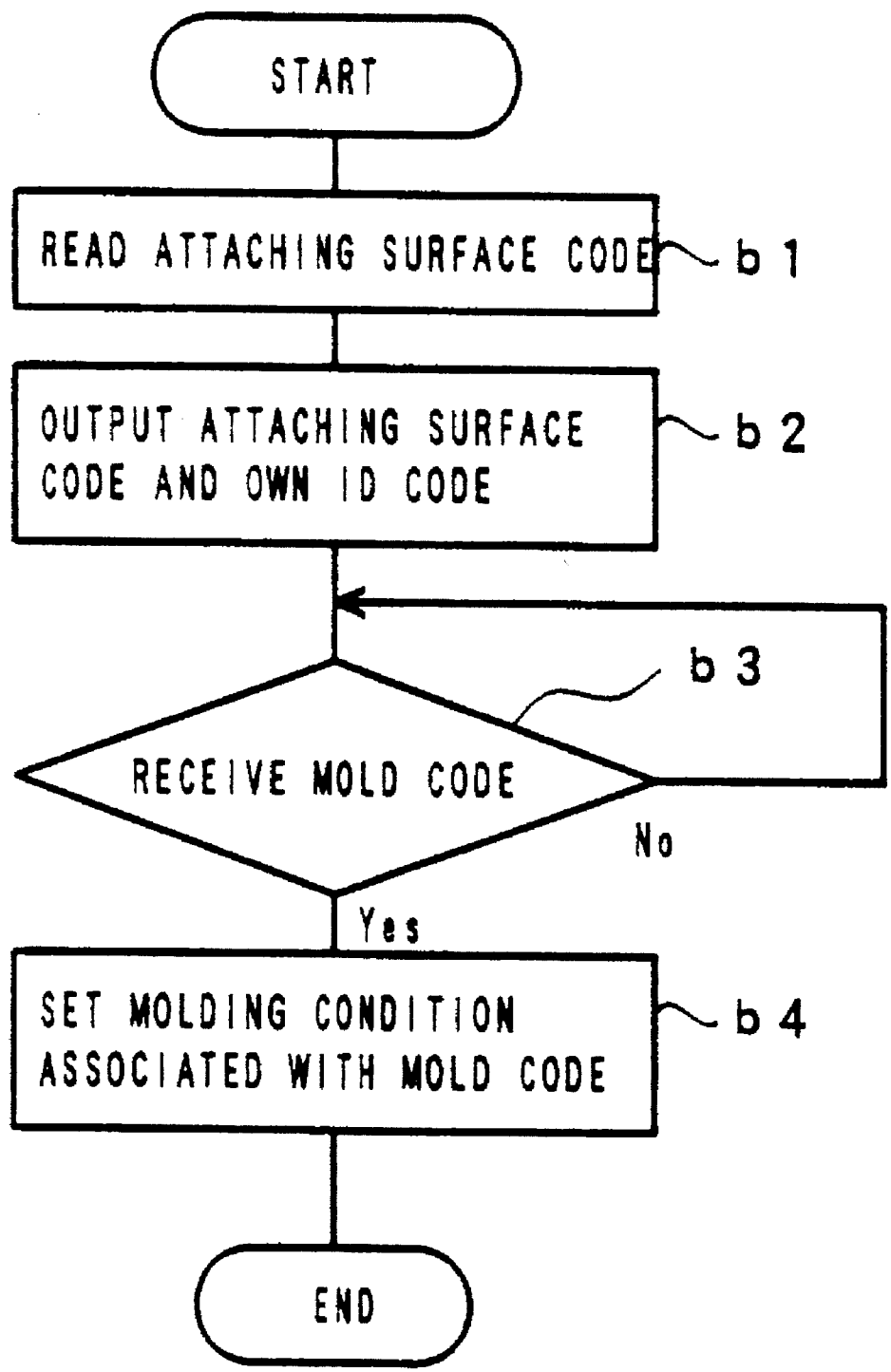
FIG. 5 is a flowchart schematically showing an attachment state checking procedure to be executed by a sub-control section in the first embodiment.

FIGS. 4 and 5 are flowcharts showing an outline of the attachment state checking processing to be applied to the arrangement of the first embodiment.

The operator firstly mounts an mold 10, which corresponds to a product to be molded, on the mold clamping unit A1 of the injection molding machine. Then the operator arranges and fixes the injection units B1-1, B2-1 and B2-2 having specifications suitable for the molding operation using the mold 10 at the respective stations 1, 2 and 3 of the mold clamping unit A1, and connects each connecting member 103 with each coupling device 104. Further, the operator electrically connects each injection unit to the mold clamping unit A1 via the respective connecting device IF1, IF2 and IF3, and sets the value of mold code specifying the mold 10 in the mold code set switch SW2.

When the operator turns the injection molding machine on power, the NC unit 30 and each NC unit 40 start the respective attachment state checking processing shown in FIGS. 4 and 5.

First, the NC unit 30 reads the information of the mold code set switch SW2 via the second channel of the connecting device IF1 and discriminates whether or not the mold code is set in the switch SW2 (Step a1). If the mold code is not set in the switch SW2, the NC unit 30 determines that the injection molding machine is not yet connected or the mold code is not yet set, and displays an error message on the screen of CRT/MDI to terminate the attachment state checking process. In such an event, the operator sets the mold code in the mold code set switch SW2 and repeatedly executes the above operation procedure.

If the mold code is already set in the mold code set switch SW2, the NC unit 30 reads the value C(i) of the mold code set in the set switch SW2 (Step a2), retrieves the molding condition storage file shown in FIG. 8, and then reads the information associated with the mold code C(i) to temporarily store the information (Step a3). Then, the NC unit 30 reads the attaching surface code S(j) from the surface information storage device SVj of the station j to which the injection unit B1-1 is connected (Step a4). Based on the attaching surface code S(j) and the mold code C(i), the NC unit 30 discriminates, from the molding condition storage file, whether or not the injection unit code D(i,j) coincides with the value of the identification code set in the identification code set switch SW 1 of the injection unit B1-1, namely, whether or not the specification of the injection unit B1-1 is fit for the injection unit to be mounted at the station j of the mold clamping unit A1 for the mold code C(i) (Step a5).

If the value of the identification code of the injection unit B1-1 is different from the injection unit code D(i,j), the NC unit 30 determines that the injection unit of the specification is not suitable to the station j to which the mold is attached and then displays an error message on the screen of CRT/MDI to terminate the attachment state checking processing. The operator checks the injection unit to be arranged at the station j of the mold clamping unit A1 and makes re-selection and rearrangement, whereupon the operator repeatedly executes the above operation procedure. At that time, the injection unit code D(i,j) specified by the mold code C(i) and the attaching surface code S(j) may be read from the molding condition storage file to display it on the screen of CRT/MDI.

If the result of discrimination of step a5 is true, the NC unit 30 further reads, via the third and fourth channels of the connecting devices IF1, IF2 and IF3, the identification code set for each injection unit B2-1 and B2-2, which are connected to the other stations, and the value of the attaching surface code assigned to each station from the surface information storage device of the station, to which each injection unit is attached, in association with each other (Step a6).

The values of attaching surface code and the identification code read in the processing of step a6 are transmitted and inputted in association with each other to the NC unit 30 of the injection unit B1-1 in the processing of step b2 by the NC unit 40 of each injection unit B2-1 and B2-2. The attaching surface codes are read from the surface information storage devices SV2 and SV3 of the mold clamping unit A1, to which the respective injection units B2-1 and B2-2 are attached, in the processing of step b1 by each NC unit 40, and the identification codes are set by the unit code setting switches SW1 of the respective units B2-1 and B2-2.

Then, the NC unit 30 compares the value of the identification code of each injection unit B2-1 and B2-2 with the value of the injection unit code specified by the attaching surface code of each injection unit B2-1 and B2-2, executes the discriminating process, which is equivalent to the above step a5 for the injection unit B1-1, for the injection units B2-1 and B2-2 of each station, and discriminates whether or not the specification of each injection unit is suitable to the respective station for the mold code C(i) (Step a7). If the value of the identification code of at least one injection unit B2-1 and B2-2 is different from the injection unit code for the station, the NC unit 30 determines that the injection unit of the specification is not suitable to the station of the mold clamping unit A1 for the currently mounted mold, and displays an error message on the screen of CRT/MDI to terminate the attachment state checking processing. As mentioned above, the operator checks the injection unit, which has the specification necessary for the molding operation using the mounted mold, and makes re-selection and rearrangement, whereupon the operator repeatedly executes the above-mentioned operation procedure. At that time, the injection unit code D(i,j), which is specified by the mold code C(i) and the attached surface code S(j), may be read from the molding condition storage file and displayed on the screen of CRT/MDI.

If the results of discrimination of steps a5 and a7 are both true, the NC unit 30 assumes that there exists no abnormality in the position of arrangement of each injection unit, and then transmits the mold code C(i) to the NC unit 40 of the injection units B2-1 and B2-2 via the third and fourth channels of the connecting devices 1F1, IF2 and IF3 (Step a8). The NC unit 30 stores, in a data-in-execution storing section of the own nonvolatile memory 23, the molding condition d(i) for the mold clamping unit, specified by the mold code C(i), and the molding condition d(i,j) for the injection unit, specified by the mold code C(i) and the attaching surface code S(j) (Step a9), making it ready to start the injection molding operation.

Each NC unit 40 retrieves, upon receipt of the mold code C(i) from the NC unit 30 (Step b3), the molding condition storage file based on the mold code C(i) and the attaching surface code read from the surface information storage devices SV2 and SV3, and then sets and stores, in the data-in-execution storing section of the own nonvolatile memory 23, the molding conditions associated with the injection unit (Step b4), making it ready to start the injection molding operation.

In the first embodiment, if at least the specification of the injection unit B1-1 meets the conditions, the position in which the injection unit B1-1 is to be arranged may be any of the stations 1, 2 and 3.

In the processing of step b2 for each NC unit 40, the value of the attaching surface code and the value of the injection unit code are simultaneously outputted through the third and fourth channels of the connecting device IF1, IF2 or IF3 to which the injection unit is connected. It is only the NC unit 30 of the injection unit B1-1 that is able to read this information. In the example of arrangement state of FIG. 3, if the attaching surface code and the injection unit code are outputted from only the fourth channel of the connecting devices IF2 and IF3, each NC unit 40 can input that information to the NC unit 30 of the injection unit B1-1. However, for example, assuming that the injection unit B2-2 positioned at the station 3 and the injection unit B1-1 positioned at the station 1 are exchanged, then the injection unit B1-1 positioned at the station 3 will become unable to read the information, i.e. the attaching surface code and the identification code, which is outputted from the injection unit B2-1 positioned at the station 2 via the fourth channel of the connecting device IF2. Now, if the attaching surface code and the identification code are simultaneously outputted via the third and fourth channels of the injection unit B2-1 positioned at the station 2, the injection unit B1-1 positioned at the station 3 can read the information outputted from the injection unit B2-1 via the third channel of the connecting device IF2, thus eliminating such a problem. As a result, the injection unit B2-2 positioned at the station 1 is electrically connected to the injection unit B2-1 positioned at the station 2 via the fourth channel of the connecting device IF2. However, since the NC unit 40 has only a function of reading the mold code to be transmitted from the NC unit 30, the information, i.e. the attaching surface code and the identification code, which is transmitted from the NC unit 40 will be blocked. Whichever station the NC unit 30 is located, it will be connected to the NC unit 40 of each injection unit B2-1 and B2-2 without fail via the third and fourth channels of the connecting device IF1, IF2 or IF3 to which the NC unit is connected, so there will be no obstruction in transmitting the signal concerning the transmission of the mold code.

In the attachment state checking processing of the first embodiment, the attaching surface code and the identification code are transmitted from each NC unit 40 to the NC unit 30 (Step b2), and then the NC unit 30 discriminates whether such information is suitable or not (Steps a6, a7). Alternatively, each NC unit 40 may discriminate, based on the associated relation between the attaching surface code and the identification code, whether or not such own information is suitable, and only the result of this discrimination may be transmitted to the NC unit 30. In the latter case, as it is necessary for each NC unit 40 to recognize the mold code of the currently mounted mold before the mold code is transmitted from the NC unit 30, the input/output circuit of each injection unit B2-1 and B2-2 has a signal line to be connected to the second channel of the connecting device, so that the value of the mold code set switch SW2 can be directly read.

Figure 6:
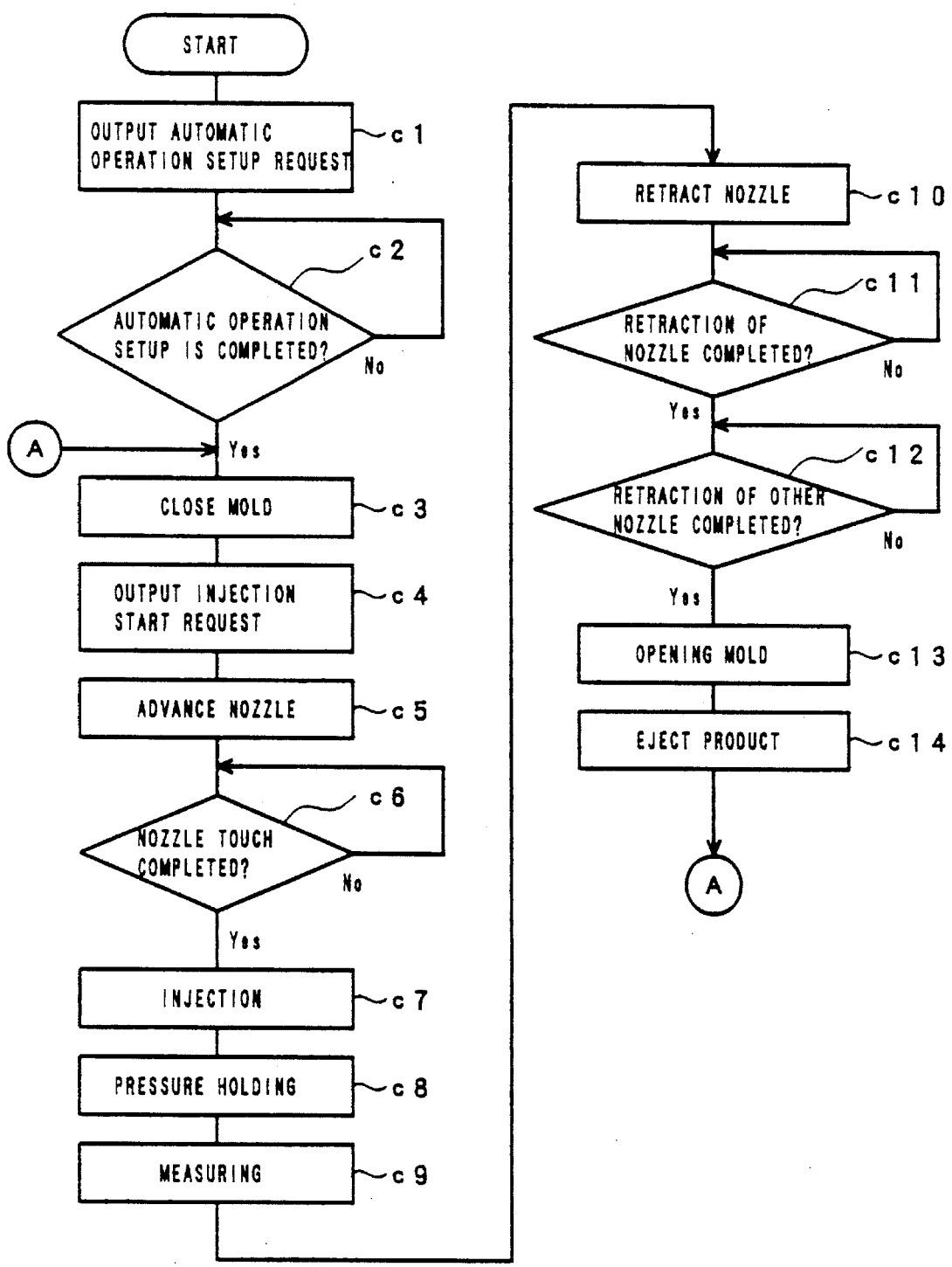
FIG. 6 is a flowchart schematically showing an automatic operating procedure to be executed by the main control section.
Figure 7:
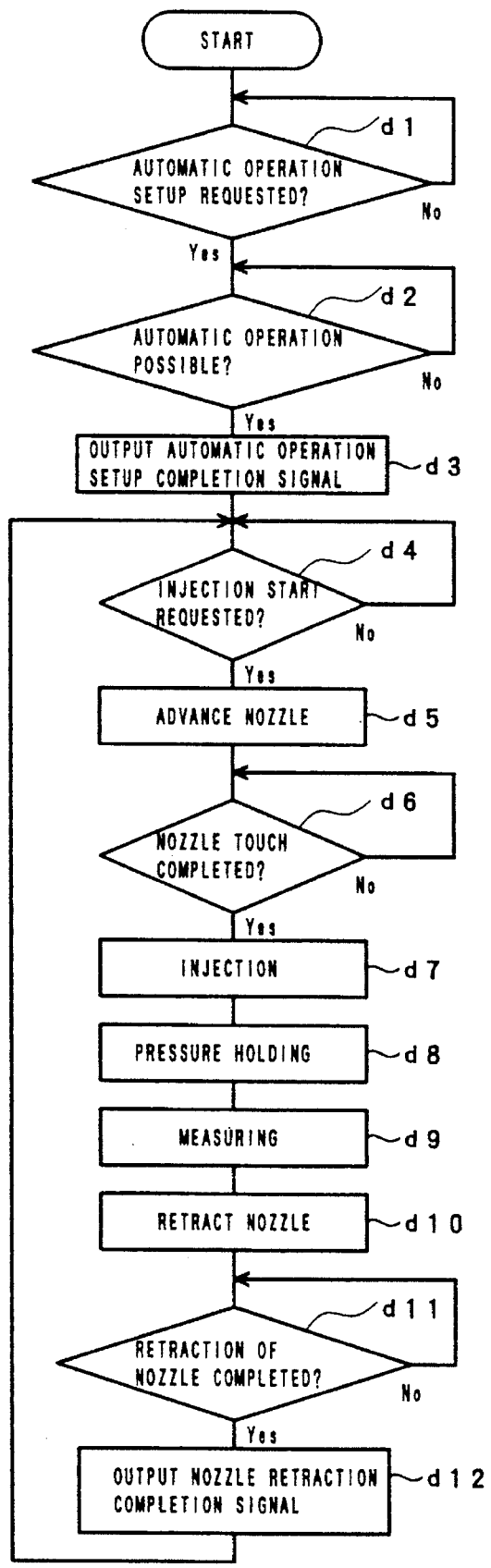
FIG. 7 is a flowchart schematically showing an automatic operating procedure to be executed by the sub-control section.

After the molding conditions are set in the data-in-execution storing section of the nonvolatile memory 23 of each injection unit, when the operator inputs a molding start command via CRT/MDI, the NC units 30, 40 will start the respective automatic operating processing of FIGS. 6 and 7.

The NC unit 30 first outputs an automatic operation setup request signal to each NC unit 40 via the third and fourth channels of the connecting device IF1, IF2 or IF3 of the station to which the injection unit B1-1 is connected (Step c1), and it will enter a waiting status for waiting an automatic operation setup completion signal to be inputted from each NC unit 40 (Step c2).

At step d1, when each NC unit 40 detects the automatic operation setup request signal from the NC unit 30, it detects whether the heater temperature of injection cylinders 100 of the injection units B2-1 and B2-2 reaches a proper value, as in the conventional manner, and discriminates whether or not the starting of the molding operation using the injection unit is possible (Step d2). If the starting of the injection molding operation is possible, each NC unit 40 outputs to the NC unit 30 the automatic operation setup completion signal via the third and fourth channels of the connecting device IF1, IF2 or IF3 of the station to which the injection unit is connected (Step d3). If the staring of the injection molding operation is impossible, each NC unit 40 repeatedly executes the discriminating process of step d2 and waits until the starting of the injection molding operation becomes possible, and then each NC unit 40 will output the automatic operation setup completion signal together with the attaching surface code to the NC unit 30 (Step d3), as mentioned above, so that it enters the waiting status for waiting the injection start command to be inputted from the NC unit 30 (Step d4).

Upon recognition of the automatic operation setup completion signals inputted from the injection units B2-1 and B2-2, the NC unit 30 terminates the waiting process of step c2 and drivingly controls the mold clamping servomotor for the mold clamping unit A1, based on the mold conditions for molding closing and mold clamping, set in the data-in-execution storing section of the nonvolatile memory 23 of the injection unit B1-1, thus completing the mold closing and the mold clamping operations (Step c3). Then, the NC unit 30 outputs the injection start command to each NC unit 40 (Step c4) and also drivingly controls the cylinder moving servomotor of the injection unit B1-1 to move the moving unit 101 of the injection unit B1-1, thus starting the nozzle touch action of the injection cylinder 100 in the injection unit B1-1 (Step c5).

Upon detection of the injection start command from the NC unit 30, each NC unit 40 terminates the waiting processing of step d4 and then, likewise the NC unit 30, drivingly controls the cylinder moving servomotor of the injection units B2-1 and B2-2 to move the moving unit 101, thus starting the nozzle touch action of the injection cylinder 100 (Step d5).

Subsequently, the NC unit 30 and the NC units 40 wait until the nozzle touching of the injection cylinder 100 in the corresponding injection unit is completed (Steps c6, d6). Upon completion of the nozzle touching, the NC unit 30 and each NC unit 40 will drivingly control the servomotors for thrusting the screw and moving the screw in each injection unit, based on the molding conditions for injection, pressure holding and measurement, set in the data-in-execution storing section of the nonvolatile memory 23, to perform the processes, i.e. injection (Steps c7, d7), pressure holding (Steps c8, d8) and measuring (Steps c9, d9). After that, each NC unit drivingly controls the cylinder moving servomotor of the respective injection unit to move the moving unit 101 of the injection unit, thus starting the sprue break action of the injection cylinder 100 (Steps c10, d10) so that it enters the waiting status for waiting the completion of the sprue break action of each injection unit (Steps c11, d11).

Upon completion of the sprue break action of the injection unit, each NC unit 40 outputs a nozzle retraction completion signal, together with the attaching surface code, to the NC unit 30 via the third and fourth channels to complete the entire cycle of the molding processes (Step d12) so that it enters the waiting status for waiting the next injection start command to be inputted from the NC unit 30 (Step d4). Also the NC unit 30 checks the completion of the sprue break action of the injection unit B1-1 by the discriminating process of step c11. Then, the NC unit 30 waits for the nozzle retraction completion signal to be inputted from the injection units B2-1 and B2-2 (Step c12), and drivingly controls the mold clamping servomotor and the ejecting servomotor of the mold clamping unit A1 based on the molding conditions for mold opening, set in the data-in-execution storing section of the nonvolatile memory 23 to perform mold closing and product ejecting operations (Step c13), whereupon it gets to start the mold closing operation for the next molding cycle (Step c3).

Subsequently, the NC unit 30 and the NC units 40 will repeatedly execute the automatic operating processing in the same matter mentioned above, thus repeating the continuous automatic operation.

Figure 9:
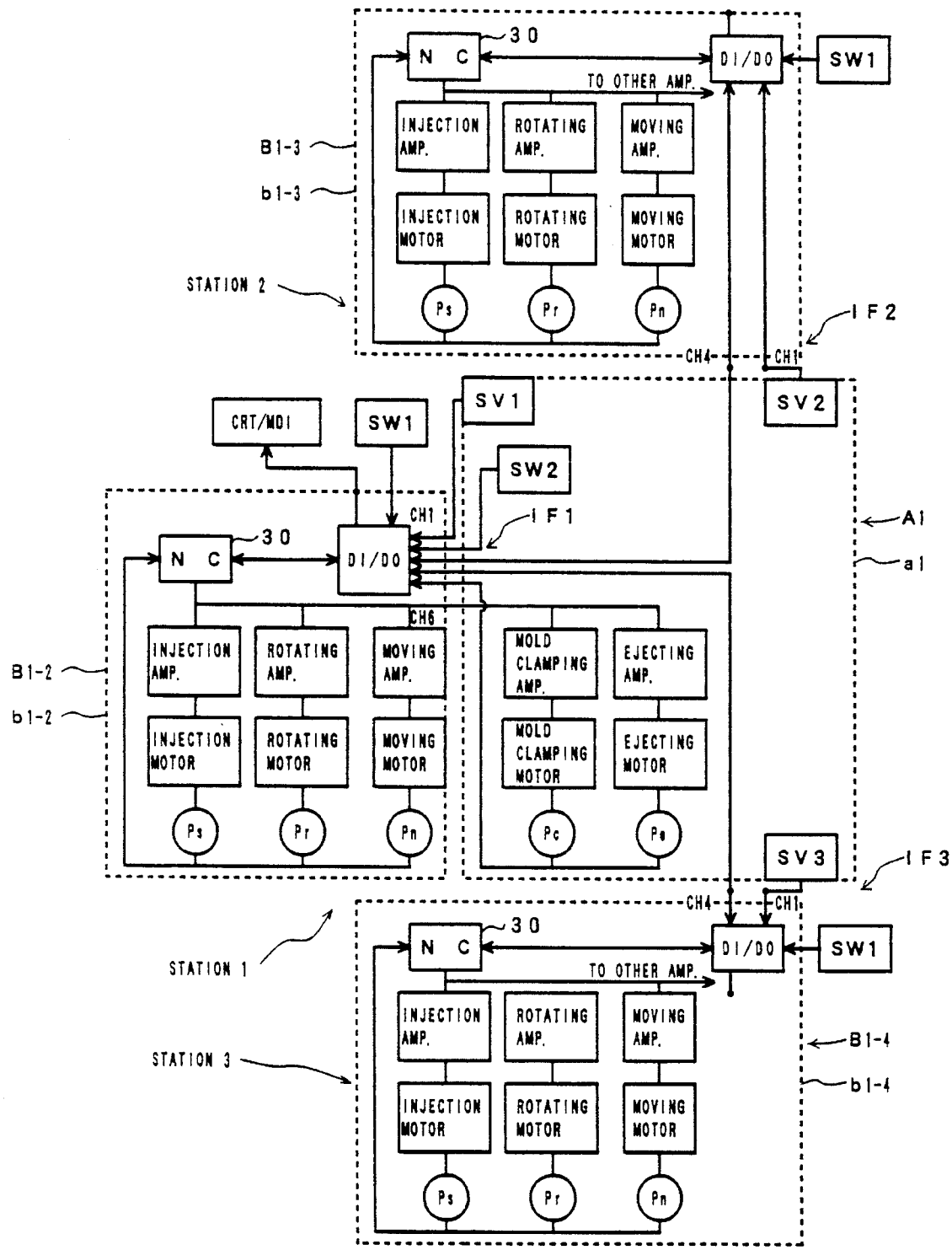
FIG. 9 is a flowchart showing a main part of a control section according to a second embodiment.

FIG. 9 is a block diagram showing the main part of the control section of the second embodiment, which is applied to drivingly control the injection molding machine having the construction of FIG. 1; parts or elements similar to those of FIG. 3 are designated by same reference numerals, and their description is omitted here.

In the second embodiment, every injection unit control section of each injection unit has a NC unit having the function of drivingly controlling servomotors for thrusting the screw, rotating the screw and moving the cylinder for each injection unit, and the function of drivingly controlling the mold clamping servomotor and the ejecting servomotor for the mold clamping unit A1. In other words, every injection units B1-2 through B1-4 have the same function as the injection unit B1-1 in the first embodiment and there is any injection unit corresponding to the injection units B2-1 and B2-2.

The second embodiment will now be described with respect to the construction different from the first embodiment.

A mold clamping servo amplifier and an ejecting servo amplifier for driving the mold clamping servomotor and the ejecting servomotor, respectively, of the mold clamping unit A1 are connected to the sixth channel of the connecting device IF1, and feedback outputs from the pulse coders Pc and Pe are connected to the fifth channel of the connecting device IF1. These servo amplifiers and pulse coders are connected only with the connecting device IF1 but are not be connected to the other connecting devices IF2 and IF3. In other words, it is only the connecting device IF1 of the station 1 that electrically connects the mold clamping unit A1 with the injection unit, and the other connecting devices IF2 and IF3 merely electrically connect the injection unit B1-2 positioned at the station 1 with the injection units B1-3 and B1-4 positioned at the stations 2 and 3, respectively. Further, the mold code set switch SW2 is only connected with the second channel of the connecting device IF1 and is not connected with the connecting devices IF2 and IF3.

As is apparent from the foregoing arrangement, in the second embodiment, it is impossible to drivingly control the servomotors of the mold clamping unit A1 by the injection units B1-3 and B1-4 positioned at the respective stations 2 and 3 in view of electrical connection even though each injection unit has such potential ability. Therefore, in the second embodiment, the NC unit 30 of the injection unit B1-2, which is connected to the station 1, is utilized as the main control device for drivingly controlling the mold clamping unit A1, in the injection unit control sections b1-2 through b1-4 having the absolutely identical functions. And the NC units 30 of the injection units B1-3 and B1-4 positioned at the remaining stations perform only the driving control of the respective injection units. CRT/MDI is detachably connected with each injection unit B1-2 through B1-4; in general, however, only one set of CRT/MDI may be provided and may be connected with the injection unit positioned at the station 1.

It is possible to provide the amplifiers for the mold clamping servomotor and the ejecting servomotor at every injection unit B1-2 through B1-4.

Figure 10:
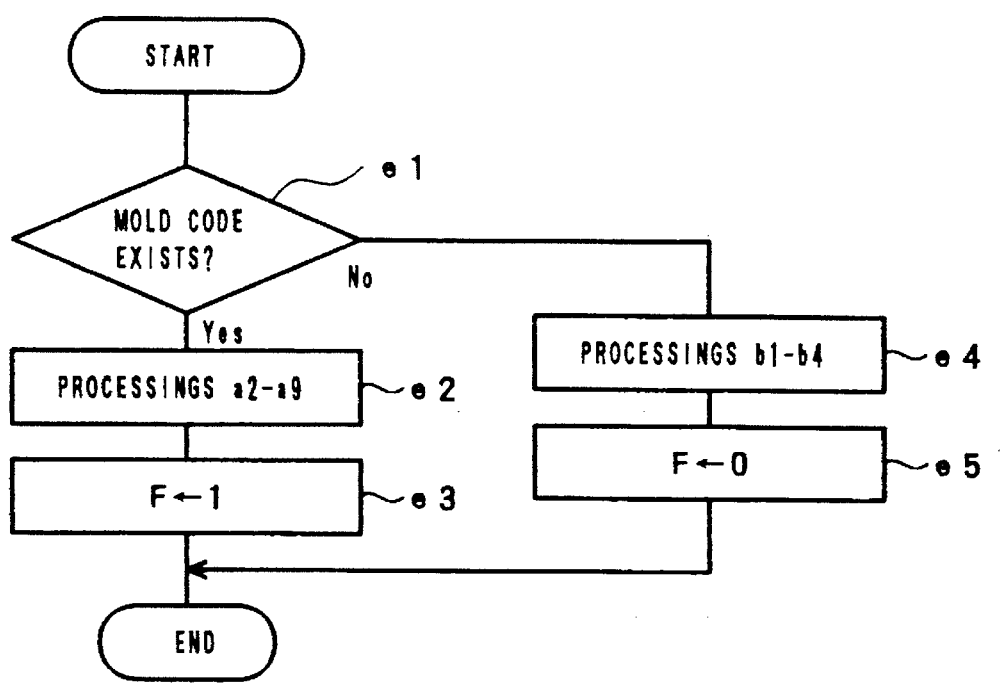
FIG. 10 is a flowchart schematically showing attachment state checking procedures to be executed by the individual control sections in the second embodiment.

FIG. 10 is a flow diagram schematically showing the attachment state checking processing to be applied for the second embodiment.

The operator firstly mounts a mold to be used for desired injection molding, on the mold clamping unit A1 of the injection molding machine, and then arranges and fixes the injection units B1-2 through B1-4, which are necessary for the molding operation using that mold, at the necessary positions of the respective stations of the mold clamping unit A1, The operator then connects each injection unit to the mold clamping unit A1 via the respective connecting device IF1, IF2, IF3 of the station at which the respective injection unit B1-2 through B1-4 is positioned, and sets in the mold code set switch SW2 the mold code designated to the mounted mold.

When the operator turns the injection molding machine on power, the NC unit 30 of each injection unit starts the attachment state checking processing shown in FIG. 10.

Each NC unit 30 reads information of the mold code set switch SW2 via the connecting device IF1, IF2 or IF3 of the station to which the injection unit is connected, and then discriminates whether or not the mold code is set in the switch SW2 (Step e1). However, since it is only the NC unit 30 of the injection unit B1-2 positioned at the station 1 that is connected with the mold code set switch SW 2, that NC unit 30 is able to read the mold code while the other NC units 30 of the injection units B1-3 and B1-4, which are connected to the remaining stations, are not able to read the mold code. Therefore, the result of discrimination in step e1 is true for the NC unit 30 of the injection unit B1-2 and false for the remaining NC units 30.

Then, the NC unit 30 executes the processing of steps a2 through a9 of FIG. 4 in the same manner as the first embodiment to discriminate whether or not the injection unit code read from the molding condition memory file and the identification code of the injection unit B1-2 actually mounted at the station 1 coincide with each other. If they not coincide with each other, the NC unit 30 of the injection unit B1-2 displays an error message on the screen of CRT/MDI to terminate the attachment state checking processing. If they coincide with each other, the NC unit 30 transmits the mold code to the remaining NC units 30, and sets and stores the molding conditions for the own NC unit (Step e2). The NC unit of the injection unit B1-2 then sets the flag F indicating that the NC unit 30 itself has been selected as the main control device, thus making it ready to start the injection molding operation (Step e3).

The NC units 30 of the injection units B1-3 and B1-4 execute the processes of steps b1 through b4 of FIG. 5 in the same manner as the first embodiment to set and store in the data-in-execution storing section of the own nonvolatile memory 23 the molding conditions specified by the mold code, which is transmitted from the NC unit 30 of the injection unit B1-2, and each attaching surface code read from the respective surface information storage device SV2 and SV3 (Step e4). By resetting the flag F, the NC units 30 of the injection units B1-3 and B1-4 store the information that these NC units 30 have been selected as the control devices for drivingly controlling only the servomotors for the respective injection units, thus making it ready to start the injection molding work (Step e5).

Figure 11:
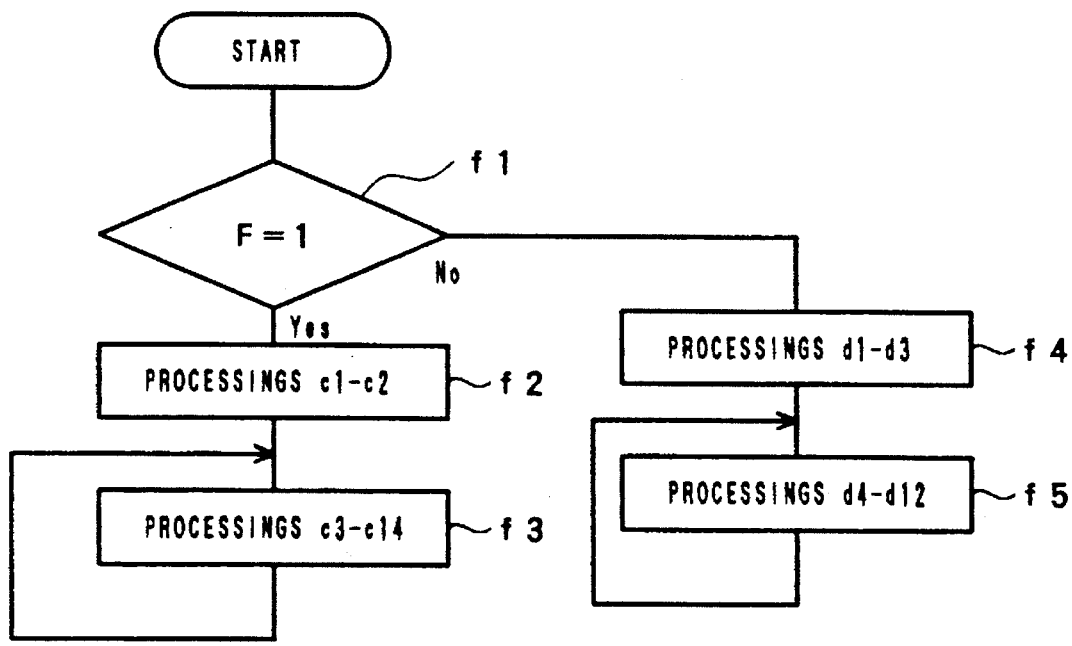
FIG. 11 is a flowchart schematically showing automatic operating procedures to be executed by the individual control sections in the second embodiment.

When the operator inputs a molding start command via CRT/MDI, the NC unit 30 of each injection unit starts the automatic operating processing as shown in FIG. 11.

The NC unit 30 of each injection unit firstly discriminates whether or not the flag F is set in the memory of the NC unit, i.e. whether the NC unit is selected as the main control device, or the control device for only drivingly controlling the servomotors in each injection unit (Step f1). The result of discrimination in step f1 is true in the NC unit 30 of the injection unit B1-2 as the main control device, and is false in the NC units 30 of the remaining injection units B1-3 and B1-4.

Subsequently, the NC unit 30 of the injection unit B1-2 executes the processing of steps c1, c2 in FIG. 6 (Step f2) and then repeatedly executes the processing of steps c3 through c14 (Step f3) to drivingly control the injection unit B1-2, which is positioned at the station 1, and the mold clamping unit A1 in the same manner as the first embodiment. On the other hand, the NC unit 30 of each injection unit B1-3 and B1-4 executes the processing of steps d1 through d3 (Step f4) in FIG. 7 and then repeatedly executes the processing of steps d4 through d12 (Step f5) to drivingly control the servomotors of each injection unit in the same manner as the first embodiment.

Figure 12:
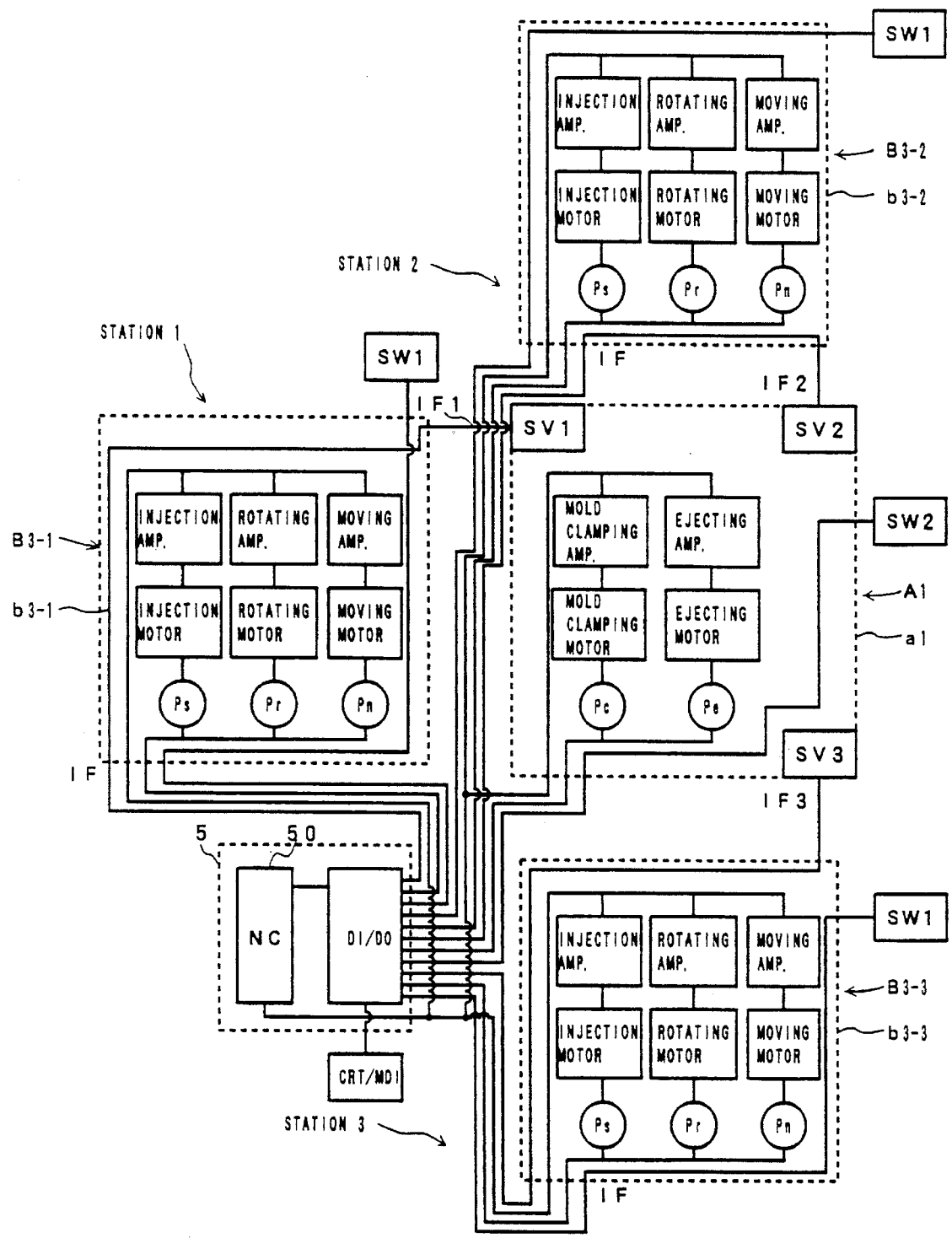
FIG. 12 is a block diagram showing a main part of a control section according to a third embodiment.

FIG. 12 is a block diagram showing a control section according to a third embodiment, which is applied to drivingly control the injection molding machine of FIG. 1. Parts or elements similar in construction to those of FIG. 9 are designated by the same reference numerals, and their description is omitted here.

In this embodiment, there is provided a control device 5 for simultaneously drivingly controlling servomotors for thrusting the screw, rotating the screw and moving the cylinder in each injection unit B3-1 through B3-3, and servomotors for clamping the mold and ejecting the molded product in the mold clamping unit A1. The NC unit 50 having the control device 5 is basically identical in construction with the NC unit 30 of FIG. 2 except the program on software. None of the injection units B3-1 through B3-3 used in the third embodiment has any NC unit for drivingly controlling each axis, so that the driving and controlling of each of the injection units B3-1 through B3-3 is performed by the NC unit 50 of the control device 5. Therefore, every injection unit B3-1 through B3-3 has a connecting device IF for electrically connecting the injection unit with the NC unit 50 of the control device 5. Transmitting of a controlling and driving command to each injection unit from the NC unit 50 of the control device 5, detecting of a feedback signal of the servomotor of each axis by the control device 5, reading of an identification code from the injection unit code set switch SW1 provided at each injection unit, and reading an attaching surface code from the surface information storing device SV1, SV2 and SV3 provided at each station of the mold clamping unit A1 are all performed by the control device 5 via the connecting device IF of each injection unit B3-1 through B3-3. Therefore, the control device 5 has connecting channels, whose number (three in the example of FIG. 12) corresponds to the number of injection units which can be mounted, for connection with the connecting device IF of each injection unit B3-1 through B3-3. Each channel has a native channel code so that a channel to be used in inputting and outputting signals are designated by the NC unit of the control device 5.

At each attachment surface of the mold clamping unit A1, an electrical connecting device IF1, IF2 or IF3 is provided for detachable connection to each injection unit B3-1 through B3-3. Each connecting device IF1, IF2, IF3 is used for reading the information, which specifies the respective attachment surface of the mold clamping unit A1, from the surface information storage device SV1, SV2, SV3 by the control device 5 via each injection unit. The connecting devices IF1, IF2 and IF3 are not interfaces for transmitting the information needed in the driving control as in the first and second embodiments. Each injection unit B3-1 through B3-3 has an information transmitting line for transmitting the information of the surface information storage device SV1, SV2, SV3 to the control device 5 via the connecting device IF of each injection unit.

The information set by the mold code set switch SW2 of the mold clamping unit A1 is read directly by the control device 5. The electrical connection between the control device 5 and the mold clamping unit A1 may be fixed or may be disconnectable like the relationship between the injection units B3-1 through B3-3 and the control device 5.

Figure 13:
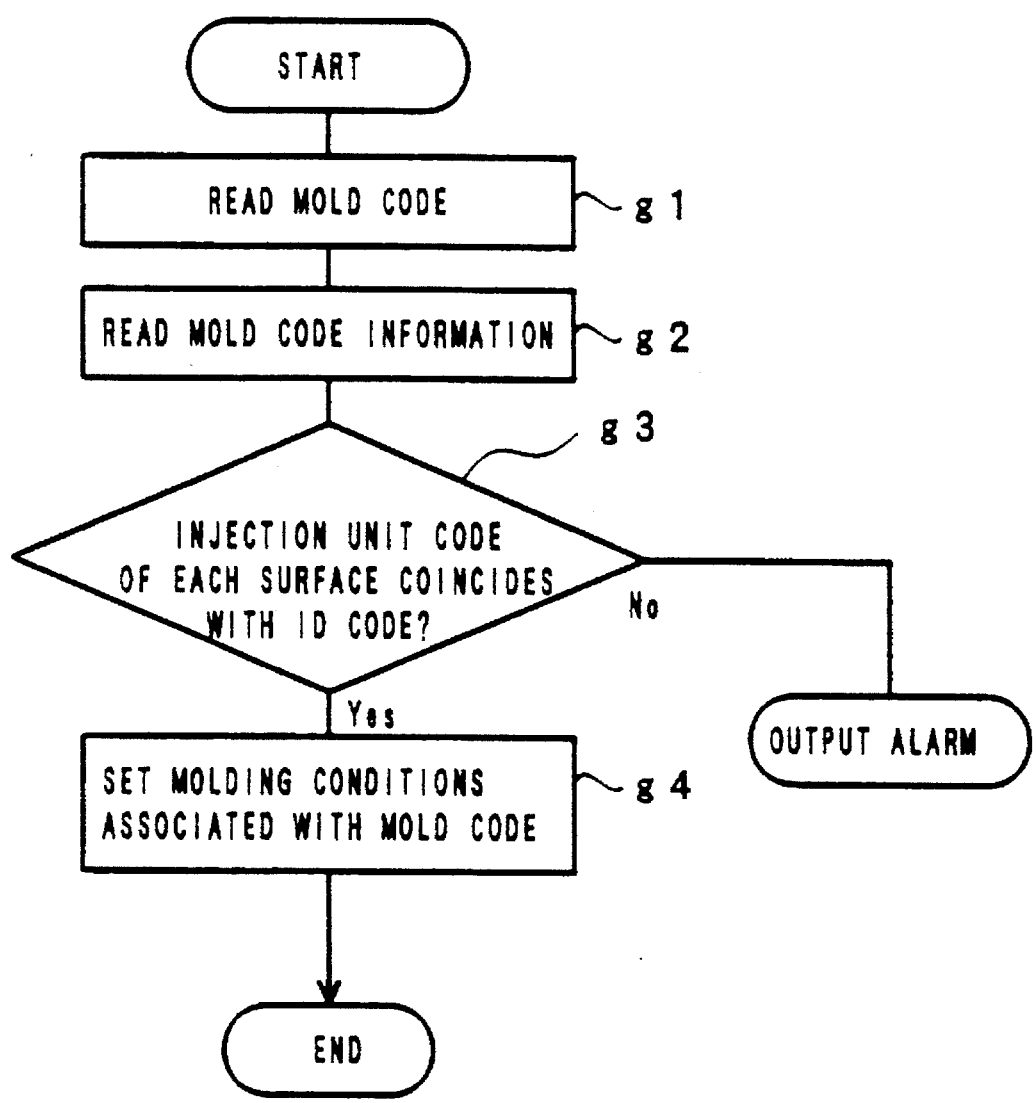
FIG. 13 is a flowchart schematically showing an attachment state checking procedure to be performed by the control section in the third embodiment.
Figure 14:
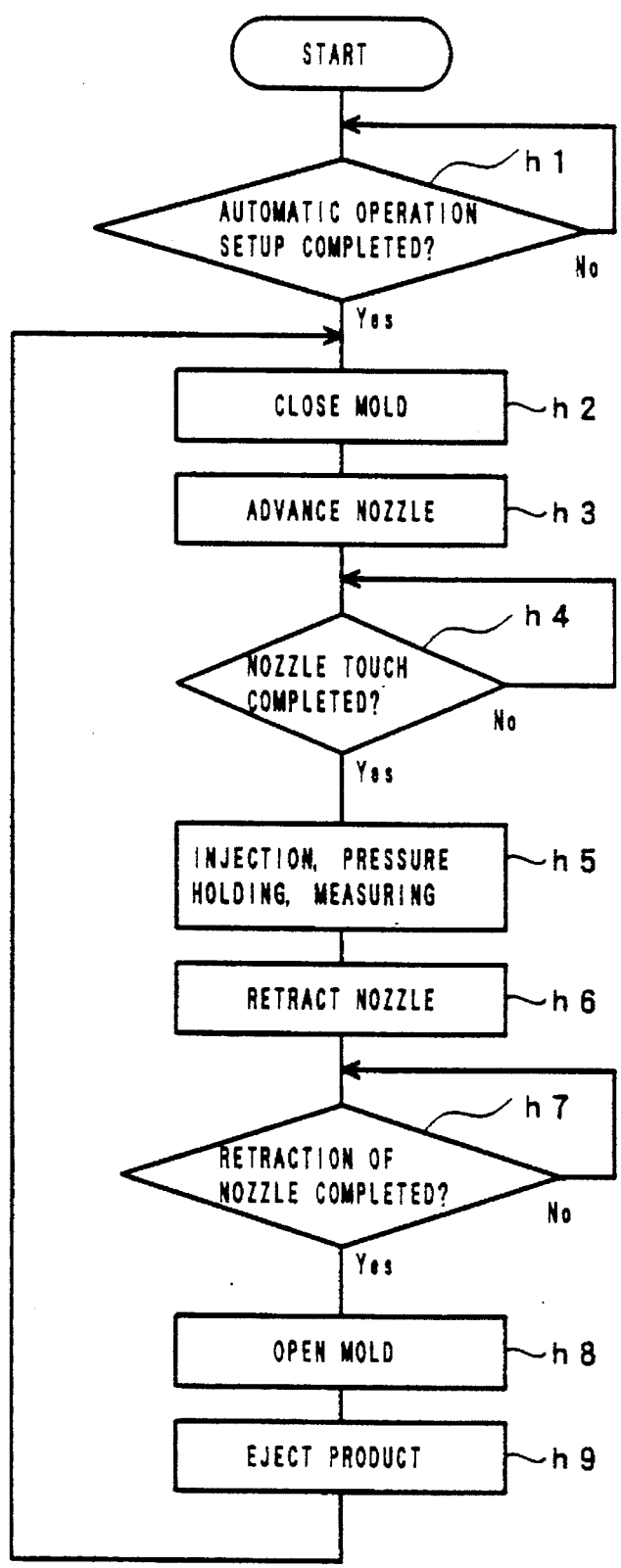
FIG. 14 is a flowchart schematically showing an automatic operating procedure to be executed by the control section in the third embodiment.

FIG. 13 is a flow chart schematically showing the attachment state checking processing to be applied to the construction of the third embodiment.

The operator firstly mounts a mold, which is to be used for desired injection molding, on the mold clamping unit A1 of the injection molding machine, then arranges and fixes the injection units B3-1 through B3-3, which are necessary for the molding operation using that mold, at the necessary positions of the respective stations of the mold clamping unit A1, and connects each injection unit to the mold clamping unit A1 via the respective connecting device IF1, IF2, IF3 of the station at which the respective injection unit is positioned. Then, the operator sets in the mold code set switch SW2 the mold code designated to the mounted mold.

When the operator turns the injection molding machine on power, the NC unit 50 of the control device 5 starts the attachment state checking processing shown in FIG. 13.

First, the NC unit 50 reads the mold code from the mold code set switch SW2 (Step g1) and reads the information associated with the mold code, by retrieving the mold condition storage file of FIG. 8, to temporarily store the information (Step g2). The NC unit 50 designates the connection channels of the control device 5 one after another, reads the identification code which is set in the identification code set switch SW1 of each injection unit, via the connecting device IF of each injection unit B3-1 through B3-3, and reads the attaching surface code of the surface information storage device provided on the surface of the mold clamping unit A1, to which the injection unit is connected, for every channel. The NC unit 50 stores the identification code of each injection unit and the attaching surface code of the surface, to which each injection unit is connected, in association with every channel. The NC unit then discriminates whether or not the injection unit code, which is stored in the molding condition storage file in association with the value of the attaching surface code of each surface and the mold code, coincides with the value of the identification code of the respective injection unit B31 through B33 actually arranged at each surface (Step g3).

Assume that the first channel of the control device 5 is connected with the injection unit B3-1 positioned at the station 1 in FIG. 12 when the mold code of the currently mounted mold is C(1). The NC unit 50 reads the value of the identification code, which is set in the injection unit code set switch SW1 of the injection unit B3-1 positioned at the station 1, via the first connection channel of the control device 5 and stores such information in association with the first channel. Therefore, if the injection unit code D(1,1), which is stored in the molding condition storage file of FIG. 8 in association with the attaching surface code SV1 and the mold code C(1), coincides with the value of the injection unit code set switch SW1 of the injection unit B3-1 positioned at the station 1, the specification of the injection unit B3-1 positioned at the station 1 is proper. If they do not coincide with each other, the specification is improper. As such processing takes place for every connection channel of the control device 5, it is discriminated whether or not the injection unit positioned at each surface is proper. Further, the relationship between each connection channel of the control device 5 and the station (attaching surface code), at which the injection unit connected with that connection channel is arranged, is stored.

If at least one of the injection unit codes of the respective surfaces, which are stored in the molding condition storage file associated with the mold code, does not coincide with the value of the identification code set switch SW1 of the actually mounted injection unit, the specification of the injection unit positioned at one or more surfaces is regarded as improper and the NC unit displays an error message on the screen of CRT/MDI to terminate the attachment state checking processing.

If the result of discrimination of step a3 is true and if the specification of every injection unit B3-1 through B3-3 is judged as proper, the NC unit 50 determines that there is no abnormality in the arrangement of each injection unit, and sets and stores all of the molding conditions stored in the molding condition storage file in association with the mold codes, e.g. all of d(1,1), d(1,2), d(1,3) and d(1,4), in the data-in-execution storing section of the nonvolatile memory 23 (Step g4), thus making it ready to start the injection molding operation.

When the operator inputs a molding start command via CRT/MDI, the NC unit 30 of each injection unit starts the automatic operation processing as shown in FIG. 11.

The NC unit 50 first detects, as in the conventional manner, whether the heater temperature of injection cylinders 100 of the injection units B3-1 through B3-3 reaches a proper value, and discriminates whether or not the starting of the molding operation using the injection unit is possible (Step h1). If the starting of the injection molding operation is possible, the NC unit 50 will drivingly control the mold clamping servomotor of the mold clamping unit A1 based on the molding conditions for mold opening and mold clamping, set in the data-in-execution storing section of the nonvolatile memory 23, then completes the mold clamping and the mold closing processes (Step h2), and then drivingly controls the cylinder moving servomotors of the respective injection units simultaneously to move the moving unit 101 of each injection unit, thus starting the nozzle touch action of the injection cylinder 100 (Step h3).

Subsequently, the NC unit 50 waits until the full nozzle touch action of the injection cylinder 100 of each injection unit is completed (Step h4). Upon completion of the nozzle touch action, the NC unit 50 drivingly controls simultaneously the screw thrusting servomotor and the screw rotating servomotor in each injection unit based on the molding conditions for each station, i.e. for each injection unit, stored in the data-in-execution storing section of the nonvolatile memory 23, for injection, pressure holding and measurement, and also based on the relationship between each connection channel of the control device 5 and the corresponding station (attaching surface code), thus performing each of the injection, the pressure holding and the measuring processes (Step h5). The injection, the pressure holding and the measuring processes for every injection unit take place substantially independently in parallel to one another by the time sharing control of the NC unit 50. Since this kind of task management process is currently known in the art, its description is omitted here.

Upon completion of the measuring/mixing process in every injection unit B3-1 through B3-3, the NC unit 50 drivingly controls the cylinder moving servomotors of the respective injection units simultaneously to move the moving unit 101 of each injection unit, then starts the sprue break action of the injection cylinder 100 (Step h6) and waits until the sprue break action of every injection unit B3-1 through B3-3 is completed (Step h7).

Upon completion of the sprue break action of the injection unit, the NC unit 50 drivingly controls the mold clamping servomotor and the ejecting servomotor of the mold clamping unit A1 based on the molding conditions for mold opening, stored in the data-in-execution storing section of the nonvolatile memory 23 to perform mold opening and product ejecting operations (Steps h8, h9), whereupon it gets to start the mold closing operation for the next molding cycle (Step h2).

Subsequently, the NC unit 50 repeatedly executes the automatic operation processing in the same matter mentioned above, thus repeating the continuous automatic operation.

Figure 15:
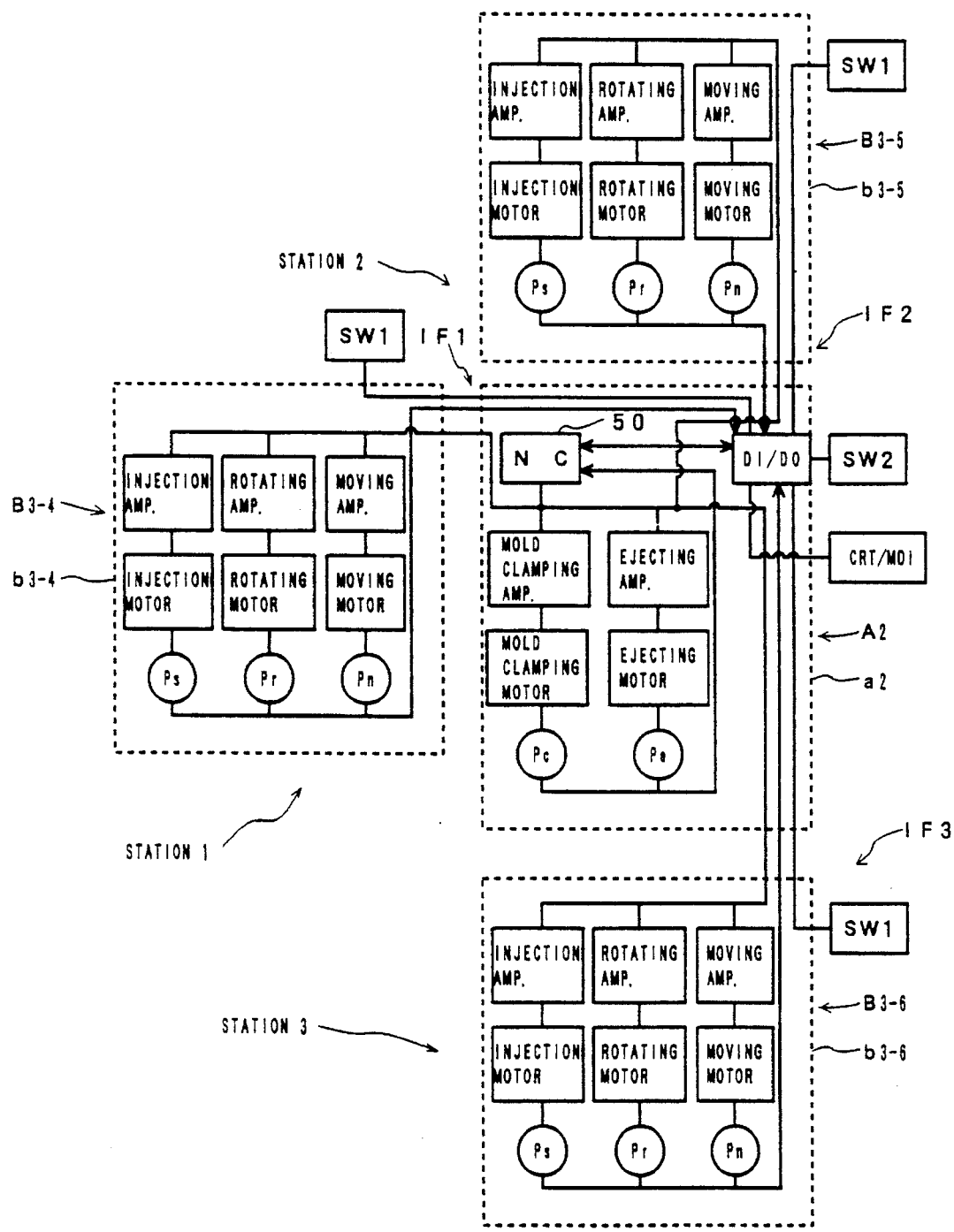
FIG. 15 is a block diagram showing a control section according to a fourth embodiment.

FIG. 15 is a block diagram showing a control section according to a fourth embodiment, which is applied to driving control of the injection molding machine of FIG. 1. Parts or elements similar in construction to those of FIG. 12 are designated by the same reference numerals, and their description is omitted here.

In this embodiment, there is provided in the mold clamping unit A2 a control device for simultaneously drivingly controlling servomotors for thrusting the screw, rotating the screw and moving the cylinder in each injection unit B3-4 through B3-6, and servomotors for clamping the mold and ejecting the molded product in the mold clamping unit A2. In other words, the control device 5 of the third embodiment is provided in the mold clamping control section a2 of the mold clamping unit A2.

At each surface of the mold clamping unit A2, a connecting device IF1, IF2, IF3 is provided for a detachable electrical connection with each injection unit B3-4 through B3-6. All the servomotors for thrusting the screw, rotating the screw and moving the cylinder in each injection unit are drivingly controlled by the NC unit 50 of the mold clamping unit A2. Therefore, each connecting device IF1, IF2, IF3 has a channel for drivingly controlling the servomotor of each injection unit B3-4 through B3-6 by the NC unit 50, a channel for inputting a feedback signal from the pulse coder of each injection unit to the NC unit 50, and a channel through which the NC unit reads the information of the identification code set switch SW1, which is provided in each injection unit B3-4 through B3-6.

In the fourth embodiment, since the NC unit 50 for drivingly controlling the mold clamping unit A2 and all of the injection units B3-4 through B3-6 is incorporated into the mold clamping unit A, the connecting relation between the NC unit 50 and the connecting devices IF1, IF2 and IF3 is constant all times so that the connecting devices IF1, IF2 and IF3 can serve as the surface information storage device. It is therefore unnecessary to provide separate surface information storage devices SV1, SV2 and SV3 such as in the first, second and third embodiments. Specifically, since the connecting channel of the control device 5 in the third embodiment may be connected with the injection unit positioned at any station, it is impossible to judge the channel and the station which are currently connected with each other, if the information of the surface information storage device is not read via each injection unit. However, in this fourth embodiment, since each of the connecting devices IF1, IF2 and IF3 is associated with each of the stations of the mold clamping unit and each of the injection units B3-4 through B3-6, the surface information storage devices SV1, SV2 and SV3 for identifying the relationship between each injection unit and station would be unnecessary. For example, if it is required to read the identification code of the injection unit B3-4 connected to the station 1, the NC unit 50 should merely read the information of the injection unit code set switch SW1 from the connecting device IF1.

This fourth embodiment is different from the third embodiment in that the NC unit 50 as the main control device is provided in the mold clamping unit A2 and that the injection unit is directly connected to the connecting device IF1, IF2, IF3 at each surface of the mold clamping unit A2 by omitting the surface information storage devices SV1, SV2 and SV3. Software for the attachment state checking processing and the automatic operation processing to be applied to this embodiment is substantially identical with that of the third embodiment, so the description concerning software is omitted here.

In the foregoing embodiments, the NC unit for drivingly controlling the servomotors for thrusting the screw, rotating the screw and moving the cylinder in each injection unit may be provided in each unit base 102 of the injection unit connected to each station, and this NC unit may be connected with the NC unit for drivingly controlling the mold clamping servomotor and the molded product ejecting servomotor of the mold clamping unit, thus drivingly controlling the injection molding machine in each axis. In such case, the injection cylinder 100 and the moving unit 101 having the screw thrusting and rotating servomotors, which are relating the specification of the injection units, should be changeable with respect to the unit base 102. Further, the identification code set switch should be mounted on the moving unit 101, so that the timing of operation of the first NC unit is controlled by the second NC unit in the mold clamping unit. In other words, the function of the NC unit 50 of the mold clamping control device a2 of FIG. 15 is divided into a section (the second NC unit) for drivingly controlling the mold clamping unit A2 and a section (the first NC unit) for drivingly controlling each injection unit, and the NC unit for drivingly controlling each injection unit is arranged in every unit base 102 of the injection unit connected to each station. The identification code set switch of the moving unit 101 is read by the second NC unit via the first NC unit. The attachment state checking processing and the automatic operation processing are substantially identical with the processing shown in FIGS. 4 through 7. However, since the second NC unit does not directly control the injection unit, the second NC unit's processing corresponding to steps a4 and a5 in FIG. 4 and steps c5 through c11 in FIG. 6 are not necessary.

Alternatively, the second NC unit may cover the functions of one or more first NC units and may directly control one or more injection units.

In each of the foregoing embodiments, the moving of the cylinder and the driving of the ejector rod are performed by the servomotors. Alternatively, ordinary geared motors may be used as the drive Source, and the positions of the nozzle and the ejector rod may be detected by limit switches, approach switches, etc.

According to the injection molding machine of this invention, it becomes possible to perform the injection molding operation by arranging, as desired, the injection units at the respective surfaces of the mold mounted on the mold clamping unit of the injection molding machine. Further, it becomes possible to avoid an inconsistency between the molding conditions and the specification of the injection unit due to an error in selecting and/or positioning the injection unit, and changing and attaching of the injection unit can be performed reliably and quickly.

What is claimed is:

1. An injection molding machine comprising:
a mold clamping unit on which a mold is mounted, said mold clamping unit having mold code inputting means for inputting a mold code representing the kind of the mounted mold and electric motors for clamping the mold and ejecting a molded product;

a main injection unit arranged in facing relation to a side surface of said mold clamping unit, said main injection unit having an injection cylinder, an injection screw, electric motors for thrusting and rotating said injection screw and moving said injection cylinder, and main control means for controlling said electric motors in said mold clamping unit and said main injection unit;

at least one sub-injection unit arranged in facing relation to a side surface of said mold clamping unit, said sub-injection unit having an injection cylinder, an injection screw, electric motors for thrusting and rotating said injection screw and moving said injection cylinder, and sub-control means for controlling said electric motors provided in said sub-injection unit; and connecting means for electrically connecting said main control means with said sub-control means and for electrically connecting said main control means with said mold clamping unit, said main control means and said sub-control means having storage means for storing an operating program and a molding condition for each of said main injection unit and sub-injection unit and for each of a plurality of mold codes, wherein said main control means controls the operation of said main injection unit and said mold clamping unit according to the operating program and the molding condition associated with the input mold code, and said sub-control means controls the operation of said sub-injection unit according to the operating program and the molding condition associated with the respective mold code.

2. An injection molding machine according to claim 1, wherein said storage means of said main control means further stores injection unit codes of said injection units to be arranged in facing relation to the respective side surfaces of said mold clamping unit for each of the mold codes, each of said injection unit having identification code storage means for storing an identification code representing the specification of the respective injection unit, said main control means having identification code reading means for reading the identification codes of said injection units actually arranged at the respective side surfaces of said mold clamping unit, comparing means for comparing the injection unit code associated with the input mold code with the identification code for the respective side surface of said mold clamping unit, and attachment state checking means for outputting an abnormality detection signal when an disagreement is detected by said comparing means.

3. An injection molding machine according to claim 2, wherein said identification code reading means has surface information storage means provided on each side surface of said mold clamping unit, for storing surface information specifying the respective side surface of said mold clamping unit, and surface information reading means provided in each injection unit, and reads the surface information read by said surface information reading means and also the identification code of each injection unit.

4. An injection molding machine comprising:

a mold clamping unit on which a mold is mounted, said mold clamping unit having mold code inputting means for inputting a mold code representing the kind of the mounted mold and electric motors for clamping the mold and ejecting a molded product;

a plurality of injection units arranged in facing relation to a side surface of said mold clamping unit, each of said injection units having an injection cylinder, an injection screw and electric motors for thrusting and rotating said injection screw and moving said injection cylinder, and control means for controlling said electric motors provided in said mold clamping unit and said injection units; and connecting means for electrically connecting one of said control means with another of said control means selectively between the respective injection units and for electrically connecting said one of said control means with said mold clamping unit, said control means of each injection unit having storage means for storing an operating program and a molding condition for drivingly controlling said electric motors in said injection units and said mold clamping unit for each of a plurality of mold codes, and only said one of said control means is electrically connected with said mold clamping unit and controls the operation of said injection units and said mold clamping unit according to the operating program and the molding condition associated with the input mold code, and said control means of each of the injection units other than said one control means controls the operation of the respective injection units according to the operating program and the molding condition associated with the input mold code.

5. An injection molding machine according to claim 4, wherein:

said storage means of each said control means further stores the injection unit codes of said injection units to be arranged at the respective side surfaces of said mold clamping unit for the respective mold code, each of said injection units having identification code storage means for storing an identification code representing the specification of the respective injection unit, and each of said control means having identification code reading means for reading the identification code of said injection unit actually arranged at the respective side surface of said mold clamping unit, comparing means for comparing the injection unit code associated with the input mold code with the identification code for the respective side surface of said mold clamping unit, and attachment state checking means for outputting an abnormality detection signal when an disagreement is detected by said comparing means.

6. An injection molding machine according to claim 5, wherein said identification code reading means has surface information storage means provided on each side surface of said mold clamping unit, for storing surface information specifying the respective side surface of said mold clamping unit, and surface information reading means provided in each injection unit, and reads the surface information read by said surface information reading means and also the identification code of each injection unit.

7. An injection molding machine comprising:

a mold clamping unit in which a mold is mounted, said mold clamping unit having mold code inputting means for inputting a mold code representing the kind of the mounted mold and electric motors for clamping the mold and ejecting a molded product;

a plurality of injection units arranged in facing relation to a side surface of said mold clamping unit, each of said injection units having an injection cylinder, an injection screw and electric motors for thrusting and rotating said injection screw and moving said injection cylinder; and a control unit electrically connected with said mold clamping unit and said respective injection units for controlling said electric motors provided in said mold clamping unit and said injection units, said control unit having storage means for storing an operating program and a molding condition for said mold clamping unit and said respective injection units for each of the mold codes, and being operable to control the operation of said mold clamping unit and the respective injection units according to the operating program and the molding condition associated with the input mold code.

8. An injection molding machine according to claim 7, wherein said control unit is provided in said mold clamping unit and is fixedly connected with said electric motors for clamping the mold and for ejecting the molded product in said mold clamping unit.

9. An injection molding machine according to claim 8, wherein said storage means of each said control means further stores the injection unit codes of said injection units to be arranged at the respective side surfaces of said mold clamping unit for the respective mold code, each of said injection units having identification code storage means for storing an identification code representing the specification of the respective injection unit, said control means having identification code reading means for reading the identification codes of said injection units actually arranged at the respective side surfaces of said mold clamping unit, comparing means for comparing the injection unit code associated with the input mold code with the identification code for the respective side surface of said mold clamping unit, and attachment state checking means for outputting an abnormality detection signal when an disagreement is detected by said comparing means.

10. An injection molding machine according to claim 9, wherein said identification code reading means has surface information storage means provided on each side surface of said mold clamping unit, for storing surface information specifying the respective side surface of said mold clamping unit, and surface information reading means provided in each injection unit, and reads the surface information read by said surface information reading means and also the identification code of each injection unit.

* * * * *

UNITED STATES PATENT AND TRADEMARK OFFICE
CERTIFICATE OF CORRECTION

PATENT NO. : 5,536,159

DATED : July 16, 1996

INVENTOR(S) : Masato YAMAMURA, et al.

It is certified that error appears in the above-indentified patent and that said Letters Patent is hereby corrected as shown below:

Title Page, [75], change "Hachioji" to --Tokyo--; and change "Fujiyoshida" and "Oshino-mura" to --Yamanashi--.

Column 13, line 26, after "they" insert --do--.

Signed and Sealed this

Twelfth Day of November, 1996

Attest:

BRUCE LEHMAN

*Attesting Officer*    *Commissioner of Patents and Trademarks*